(12) United States Patent
Kurishige et al.

(10) Patent No.: US 6,445,987 B1
(45) Date of Patent: Sep. 3, 2002

(54) ELECTRIC POWER STEERING CONTROLLER AND CONTROL METHOD

(75) Inventors: Masahiko Kurishige; Noriyuki Inoue; Ryoji Nishiyama; Shunichi Wada; Takayuki Kifuku, all of Tokyo (JP)

(73) Assignee: Mitsubushi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/781,552

(22) Filed: Feb. 13, 2001

(30) Foreign Application Priority Data

Feb. 5, 2000 (JP) .......................... 2000-049664

(51) Int. Cl.⁷ ............................ G06F 7/00; G06F 17/00
(52) U.S. Cl. .............................. 701/41; 701/22; 701/84; 180/410; 180/443
(58) Field of Search .................. 701/22, 41, 84; 180/168, 410, 422, 443

(56) References Cited

U.S. PATENT DOCUMENTS

| | | | |
|---|---|---|---|
| 3,636,794 A | * | 1/1972 | Van Wicklin, Jr. ............. 74/495 |
| 5,684,700 A | * | 11/1997 | Crocker ........................ 701/41 |
| 5,740,040 A | | 4/1998 | Kifuku et al. |
| 5,896,942 A | * | 4/1999 | Bohner et al. .............. 180/402 |
| 5,944,137 A | | 8/1999 | Moser et al. |
| 6,053,270 A | * | 4/2000 | Nishikawa et al. ......... 180/168 |

FOREIGN PATENT DOCUMENTS

| | | |
|---|---|---|
| EP | 0 860 347 X Y | 8/1998 |
| EP | 1 077 171 A | 2/2001 |
| JP | 6-87458 | 3/1994 |
| JP | 7-186994 | 7/1995 |

OTHER PUBLICATIONS

Mitsubishi Denki Giho, vol. 70, No. 9, (1996), pp. 43–48.
U.S. patent application Ser. No. 09/604289, Nishiyama et al.

* cited by examiner

Primary Examiner—Gertrude Arthur
(74) Attorney, Agent, or Firm—Leydig, Voit & Mayer, LTD

(57) ABSTRACT

An electric power steering controller and a control method for assisting a driver during handling a steering wheel in a condition of a small road surface reaction torque of a tire by generating an auxiliary return torque for letting the steering wheel return to its original position. A first road surface reaction torque is estimated from a steering torque of a driver detected by a steering torque detector, a motor acceleration detected by a motor acceleration detector, and a motor current detected by a motor current detector. A second road surface reaction torque is estimated from a steering angle detected by a steering angle sensor, and a vehicle speed detected by a vehicle speed detector. Then, first and second auxiliary return torque signals of the steering wheel are computed from a road surface reaction torque, and, based on the computed result, a torque of the motor is controlled in direction so the steering wheel is returned to its original position.

20 Claims, 12 Drawing Sheets

ELECTRIC POWER STEERING CONTROLLER AND CONTROL METHOD

BACKGROUND OF THE INVENTION

1. Technical Field

The present invention relates to an electric power steering controller and a control method, and more particularly to an electric power steering controller and a control method for an automotive vehicle to aid a steering force of a driver by generating an assistant torque in a steering system.

2. Background Art

In an example, Japanese laid open Patent No. 7-186994, in FIG. 13 shows a configuration of an electric power steering controller. In this figure a steering torque detector 1 detects a steering torque of a driver. A steering torque control unit 2 computes an auxiliary torque based on an output of the steering torque detector 1. A motor speed detector 3 detects a speed of a motor. A damping compensator 4 computes a damping compensating signal based on the speed of the motor detected by the motor speed detector 3. A motor acceleration detector 5 detects a acceleration of a motor using an output of the motor speed detector 3. An inertia compensator 6 computes an inertia compensating signal based on the acceleration of the motor detected by the motor acceleration detector 5. A judging unit 7 judges whether a direction of an output of the steering torque detector 1 and an output of the motor speed detector 3 are identical, and outputs the judgment result to the steering torque control unit 2, the damping compensator 4, and the inertia compensator 6. A first adder 8 adds the auxiliary torque signal, the damping compensating signal, and the inertia compensating signal. A motor current determiner 9 computes an aimed, i.e., target, current signal from an aimed torque, which is equal to an output of the first adder 8. A motor 10 drives a steering mechanism by generating an auxiliary torque approximately proportional to a motor current, which is generated according to an applied voltage. A motor current detector 11 detects a current of the motor 10. A second adder 12 computes a difference between the aimed current signal, which is the output of the motor current determiner 9, and the current of the motor detected by the motor current detector 11. A motor driver 13 determines and applies a voltage to the motor 10 based on an error signal between the aimed current signal computed by the motor current determiner 9 and the current of the motor detected by the motor current detector 11. A vehicle speed detector 14 detects a speed of the vehicle, and outputs the speed of the vehicle detected to the steering torque controller 2, the damping compensator 4, and the inertia compensator 6.

When a driver handles a steering wheel, the steering torque is measured by the steering torque detector 1, and is output to the steering torque controller 2. The steering torque controller 2 computes an auxiliary torque signal approximately proportional to the output signal of the steering torque detector 1, and assists the steering torque of the driver by controlling the motor 10 based on the auxiliary torque signal.

At this time, the judging unit 7 judges whether the direction of an output of the steering torque detector 1 and that of the motor speed detector 3 are same or not, and if the directions are same, both the damping compensator 4 and the inertia compensator 6 are stopped and only the torque controller 2 is operated. The steering torque controller 2 determines the auxiliary torque signal according to the output of the steering torque detector 1 and the speed signal from the vehicle of the vehicle speed detector 14. The aimed torque is determined based on the auxiliary torque signal, and a motor driving current is determined by the motor current determiner 9.

When the directions mentioned above are different, the steering torque controller 2 is stopped, and both the damping compensator 4 and the inertia compensator 6 are operated. The aimed torque is determined based on the outputs of the damping compensator 4 and the inertia compensator 6, and the motor driving current is determined by the motor current determiner 9. In this case, the direction of the aimed torque is made to coincide with a direction of a motor rotation when the vehicle speed is low, and, similarly, the direction of the aimed torque is made to oppose the direction of the motor rotation when the vehicle speed is high. Therefore, when a driver is handling the steering wheel in the direction for the steering angle to increase, the steering torque required by the driver is assisted to mitigate the steering torque required. Moreover, the motor 10 is also controlled in the following fashion. When a driver is turning the steering wheel in the direction for the steering angle to decrease, he is assisted in returning the steering wheel to its original position when the vehicle speed is low, and is also assisted to prevent the steering wheel from returning excessively when the vehicle speed is high.

In general, a driver turns the steering wheel at a curve or a crossing of a road, and then returns the steering wheel, for returning to straight running making use of a voluntary return force from the road surface reaction torque of a tire. However, there are frequently cases, wherein the road surface reaction torque of the tires is small enough to cause the road surface reaction torque to become smaller than a friction torque in the steering mechanism, and the steering wheel does not return to a straight path when the vehicle speed is low or steering operation is minute. Therefore, in this case, a driver himself has to return the steering wheel by adding steering torque, hence there is a problem that the steering feeling is reduced.

Regarding this point in the prior art, the output of the steering torque detector 1 and the output of the motor speed detector 3 are checked for their coincidence, and if the result is different, the return ability of the steering wheel is raised by determining the motor driving current so that the motor 10 is rotated in the same direction as the rotating motor.

As heretofore explained, in the prior art the steering wheel is in a halted condition and the motor 10 does not rotate unless a driver applies a steering torque to the steering wheel into a returning direction when the steering wheel is handled in a range of the small road surface reaction torque of the tier in case the vehicle is curving a crossing at a low speed or running along a loose curve at a high speed. In this case the judging unit 7 is unable to judge whether or not the direction of the output of the steering torque detector 1 and that of the motor speed detector 3 is identical. Accordingly, there is a problem, wherein the motor driving current can not be determined so as to drive the motor 10 into the same direction with the rotating motor, hence the returnable ability of the steering wheel can not be raised. There is also another problem, wherein a running becomes difficult in a bad condition like a slippery snowy road as no control according to the road surface condition is executed.

SUMMARY OF THE INVENTION

In view of the above, it is the object of the present invention to provide an electric power steering controller and a control method for an automotive vehicle capable of promoting a returnable ability of a steering wheel under the various driving conditions, wherein the steering wheel is returnable without a torque being applied by a driver into a returning direction , and instead a returning control of the steering wheel is executed depending on a steering angle at will of the driver even in a running condition such that a vehicle is turning a crossing at a low speed or curving along a road at a high speed.

Furthermore, it is another object of the present invention to provide a control method of the electric power steering controller to attain the above object.

According to this invention ,an electric power steering controller for an automotive vehicle to assist a steering torque of a driver to a steering wheel comprising:

a motor for generating an assistant torque to assist said steering torque of a driver, a steering torque detecting means for detecting the steering torque of a driver, a steering angle detecting means for detecting a steering angle of said steering wheel, a first reaction torque estimating means for estimating a first road surface reaction torque using said steering torque detected by said steering torque detecting means, a second reaction torque estimating means for estimating a second road surface reaction torque using said steering angle detected by said steering angle detecting means, a return torque compensating means for computing a first auxiliary return torque signal to control said assistant torque of said motor depending on said first road surface reaction torque estimated by said first reaction torque estimating means, and for computing a second auxiliary return torque signal to control said assistant torque of said motor depending on said second road surface reaction torque estimated by said second reaction torque estimating means, wherein said return torque compensating means controls said assistant torque of said motor into the direction for said steering wheel to return to its original position by using both said first and said second auxiliary return torque signals.

In the above steering cotroller, said return torquecompensating means multiplies said second road surface reaction torque estimated by said second reaction torque estimating means by a gain constant, and then limits the maximum value of the above multiplied signal for computing said second auxiliary torque signal.

Furthermore, in the electric power steering controller said return torque compensating means multiplies said road surface reaction torque detected by said reaction torque estimating means by a gain constant, and then computes said first auxiliary return torque signal by limiting a maximum value of the multiplied signal with a limiter.

Furthermore, in the electric power steering controller said return torque compensating means controls said assistant torque of said motor by multiplying said first and said second auxiliary return torque signals by a weight coefficient in a weighting.

Furthermore, in the electric power steering controller said weighting made by said return torque compensating means is carried out based on at least one signal of a vehicle speed signal and a bank angle signal on a road surface.

Furthermore, in the electric power steering controller said weight coefficient used in weighting is set based on a comparison between said first and said second road surface reaction torques.

Furthermore, in the electric power steering controller said weight coefficient is set based on a difference of said first and said second road surface reaction torques.

Furthermore, in the electric power steering controller said weight coefficient is set based on a ratio of said first and said second road surface reaction torques.

Furthermore, in the electric power steering controller further comprising a road surface condition judging means for judging a road surface condition using said first and said second road surface reaction torques.

Furthermore, in the electric power steering controller said road surface condition judging means compares an absolute value of said first road surface reaction torque with that of said second road surface reaction torque, and judges a road surface condition to be a non-high friction road if said absolute value of said second road surface reaction torque is larger than that of said first road surface reaction torque, and simultaneously if a difference of said absolute values of said first and said second road surface reaction torques exceeds a predetermined value.

Furthermore, in the electric power steering controller said road surface condition judging means compares an absolute value of said first road surface reaction torque with that of said second road surface reaction torque, and judges a road surface condition to be a non-high friction road if said absolute value of said second road surface reaction torque is larger than that of said first road surface reaction torque, and simultaneously if said ratio of said absolute values of said first and said second road surface reaction torques exceeds a predetermined value.

Furthermore, in the electric power steering controller a judged result by said road surface condition judging means is used to compensate for said weight coefficient.

Furthermore, in the electric power steering controller said return torque compensating means makes said weight coefficient larger which is to be multiplied to said first auxiliary return torque signal if a road surface condition is judged to be said non-high friction road by said road surface condition judging means.

Furthermore, in the electric power steering controller said return torque compensating means controls said assistant torque of said motor based on said second auxiliary return torque signal if said road surface condition is judged to be a high friction road by said road surface condition judging means, and also controls said assistant torque of said motor by making said weight coefficient smaller which is to be multiplied to said second auxiliary return torque signal if said road condition is judged to be said non-high friction road by said road surface condition judging means.

In addition, an electric power steering controller for an automotive vehicle to assist a steering torque of a driver to a steering wheel comprising:

a motor for generating an assistant torque to assist said steering torque of a driver, a speed detecting means for detecting a speed of the automotive vehicle, a steering torque detecting means for detecting the steering torque of a driver, a steering angle detecting means for detecting a steering angle of said steering wheel, an acceleration detecting means for detecting an acceleration of said motor, a current detecting means for detecting a current of said motor, a first reaction torque estimating means for estimating a first road surface reaction torque obtained by letting a signal pass through a low pass filter, wherein the signal is computed from said steering torque detected by said steering torque detecting means, said acceleration of said motor detected by said acceleration detecting means, and said current of said motor detected by said current detecting means, a second reaction torque estimating means for estimating a second road surface reaction torque using said speed of said automotive vehicle detected by said speed detecting means, and said steering angle detected by said steering angle detecting means, and a return torque compensating means for computing a first auxiliary return torque signal to control said assistant torque of said motor depending on said first road surface reaction torque estimated by said first reaction torque estimating means, and for computing a second auxiliary return torque signal to control said assistant torque of said motor depending on said second road surface reaction torque estimated by said second reaction torque estimating means, wherein said return torque compensating means controls said assistant torque of said motor into the direction for said steering wheel to return to its original position by using both said first and said second auxiliary return torque signals.

In addition, an electric power steering controller to assist a steering torque of a driver to a steering wheel comprising:

a motor for generating an assistant torque to assist the steering torque of a driver, a steering torque detecting means for detecting said steering torque of a driver, a steering angle detecting means for detecting a steering angle of said steering wheel, a reaction torque estimating means for estimating a road, surface reaction torque using said steering torque detected by said steering torque detecting means, and a return torque compensating means for computing a first auxiliary return torque signal to control said assistant torque of said motor depending on said road surface reaction torque estimated by said reaction torque estimating means, and for computing a second auxiliary return torque signal to control said assistant torque of said motor depending on said steering angle detected by said steering angle detecting means, wherein said return torque compensating means controls an auxiliary torque of said motor into the direction for said steering wheel to return to its original position by using both said first and said second auxiliary return torque signals.

In addition, an electric power steering controller for an automotive vehicle to assist a steering torque of a driver to a steering wheel comprising:

a motor for generating an assistant torque to assist the steering torque of a driver, a speed detecting means for detecting a speed of said automotive vehicle, a steering torque detecting means for detecting the steering torque of a driver, a steering angle detecting means for detecting a steering angle of the steering wheel, an acceleration detecting means for detecting an acceleration of said motor, a current detecting means for detecting a current of said motor, a reaction torque estimating means for estimating a road surface reaction torque which is obtained by letting a signal pass through a low pass filter, wherein the signal is computed from said steering torque detected by said steering torque detecting means, said acceleration of said motor detected by said acceleration detecting means, and said current of said motor detected by said current detecting means, and a return torque compensating means for computing a first auxiliary return torque signal to control said assistant torque of said motor depending on said road surface reaction torque estimated by said reaction torque estimating means, and for computing a second auxiliary return torque signal to control said assistant torque of said motor depending on said speed of said automotive vehicle detected by said speed detecting means and said steering angle detected by said steering angle detecting means, wherein said return torque compensating means controls said assistant torque of said motor into the direction for said steering wheel to return to its original position by using both said first and said second auxiliary return torque signals.

In addition, an electric power steering control method for an automotive vehicle to assist a steering torque of a driver to a steering wheel by using a motor generated torque with steps comprising:

estimating a first road surface reaction torque from a steering torque, estimating a second road surface reaction torque from a steering angle, computing a first auxiliary return torque signal from said first road surface reaction torque, computing a second auxiliary return torque signal from said second road surface reaction torque, and controlling the assistant torque of said motor depending on said first and said second auxiliary return torque signals to let a steering wheel return to its original position.

Furthermore, the electric power steering control method further comprising a step of weighting to said first and said second auxiliary return torque signals for use in controlling said assistant torque of said motor.

Furthermore, the electric power steering control method further steps comprising:

judging a road surface condition from said first and said second road surface reaction torques, and compensating a weight coefficient for weighting according to the judged result.

As described above, the power steering controller and a control method according to the present invention has the following features.

A suitable assistant torque of the motor for assisting the steering torque of a driver is generated under various driving conditions as the assistant torque of the motor is controlled into the direction for the steering wheel to return to its original position, wherein the assistant torque of the motor is obtained from the road surface reaction torque or the road surface condition.

Therefore, a driver is always able to run the automotive vehicle safely in handling the steering wheel in any driving and road conditions.

DETAILED DESCRIPTION OF THE PREFERRED EMBODIMENTS

First of all, a detailed explanation concerning an embodiment 1 is made.

Figure 1:
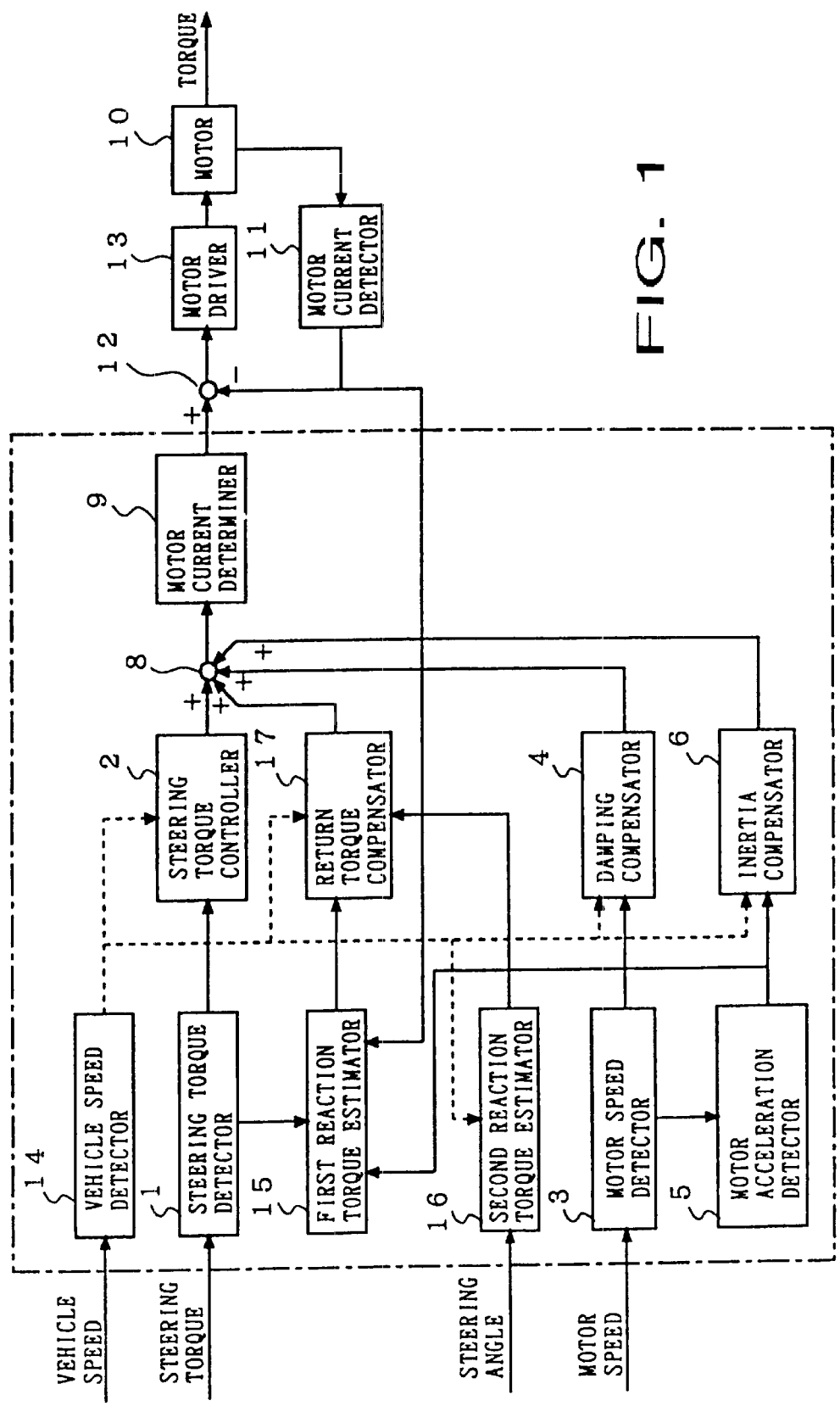
FIG. 1 is a block diagram showing a configuration of an electric power steering controller in an embodiment 1 according to the present invention.

FIG. 1 is a block diagram showing a configuration of an electric power steering controller in the embodiment 1 according to the present invention.

In this FIG. 1, a steering torque detector 1 as a steering torque detecting means is for detecting a steering torque of a driver, a steering torque controller 2 is for computing an auxiliary torque signal based on an output of the steering torque detector 1, a motor speed detector 3 is for detecting a speed of a motor, a damping compensator 4 is for computing a damping compensating signal based on the speed of the motor detected by the motor speed detector 3, a motor acceleration detector 5 as a motor acceleration detecting means is for detecting an acceleration of the motor using an output of the motor speed detector 3, an inertia compensator 6 is for computing an inertia compensating signal based on the acceleration of the motor detected by the motor acceleration detector 5, a first adder 8 is for computing a sum of the auxiliary torque signal, an auxiliary return torque signal of a steering wheel to be mentioned afterward, the damping compensating signal and the inertia compensating signal, a motor current determiner 9 is for computing an aimed current signal from an aimed torque which is a sum of the auxiliary torque signal and the auxiliary return torque signal of the steering wheel, the damping compensating signal and the inertia compensating signal, a motor 10 is for driving a steering mechanism by producing an assistant torque which is approximately proportional to a current value of the motor generated in accordance with an applied voltage, a motor current detector 11 as a motor current detecting means is for detecting a motor current value, a second adder 12 is for computing a difference between the aimed current signal which is an output of the motor current determiner 9 and the motor current value detected by the motor current detector 11, a motor driver 13 is for determining a voltage to apply to the motor 10 based on an error signal between the aimed current signal computed by the motor current determiner 9 and the motor current value detected by the motor current detector 11, and then applying the determined voltage to the motor 10. And a vehicle speed detector 14 as a vehicle speed detector means for detecting a speed of a vehicle, and then applying the a detected speed to the steering torque controller 2, the damping compensator 4, the inertia compensator 6 and a return torque compensator 17 to be mentioned afterward.

A first road surface reaction torque estimator 15 including a low pass filter as a first reaction torque estimating means is for estimating a steering angle of a front wheel, that is, a first reaction torque to let the steering wheel return to its original position by using the steering torque of the driver detected by the steering torque detector 1, the motor acceleration detected by the motor acceleration detector 5 and the motor current value detected by the motor current detector 11. A second road surface reaction torque estimator 16 as a second reaction torque estimating means is for estimating a second road surface reaction torque from a steering angle detected by a steering angle sensor built in a steering wheel axis as a steering angle detecting means and the speed of the vehicle detected by the vehicle speed detector 14. A return torque compensator 17 as a return torque compensating means is for computing and outputting an auxiliary return torque signal of the steering wheel to generate an assistant torque to let the steering wheel return to its original position.

For example, as the motor speed detector 3, a tachometer generator or a rotary encoder, wherein a difference of a pulse output is computed is usable. Furthermore, a reverse electro motive force is capable of being used as the motor speed detector, which is obtained by subtracting a multiplied value of the motor current and a coil resistance from the applied voltage to the motor.

Figure 2:
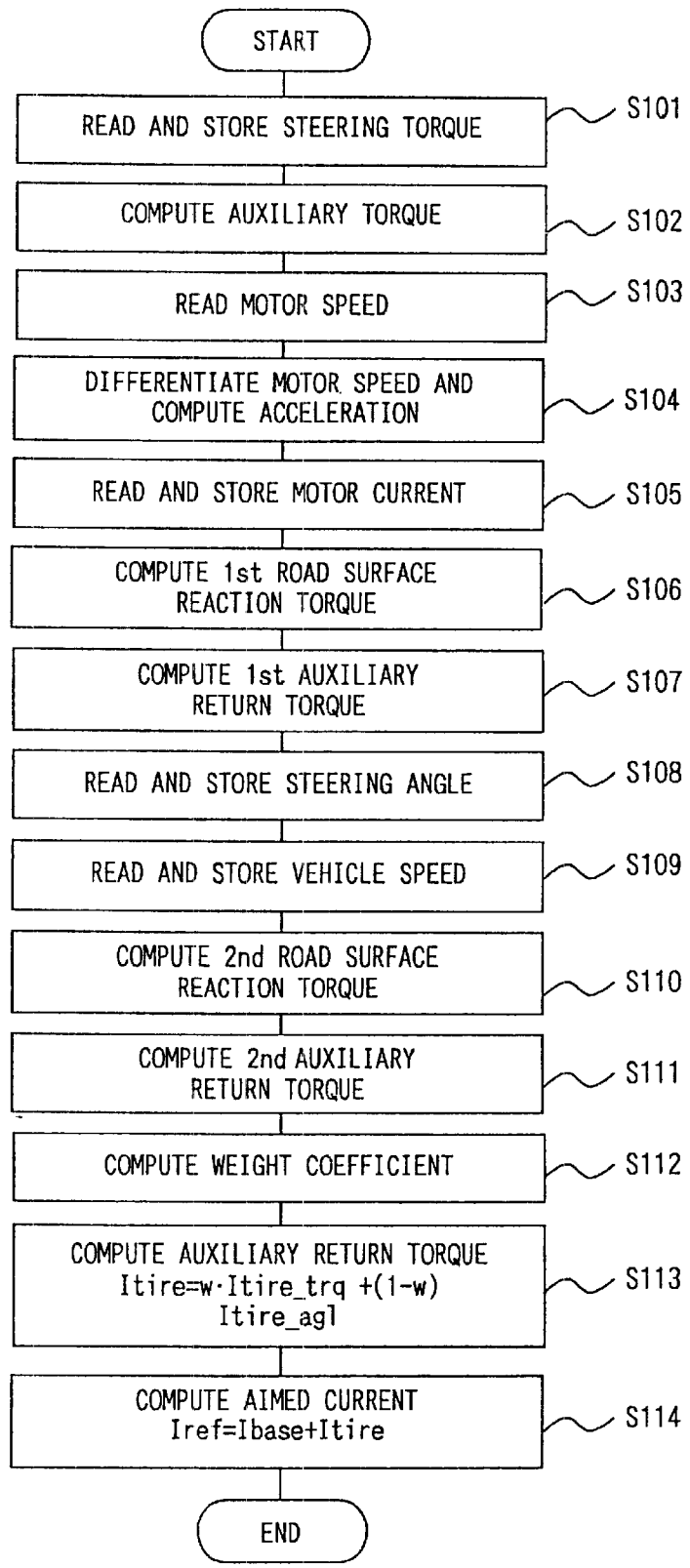
FIG. 2 is a flow chart of the electric power steering controller explaining an operation in the embodiment 1 according to the present invention.

FIG. 2 is a flow chart of the electric power steering controller explaining an operation in the embodiment 1 according to the present invention.

Figure 3:
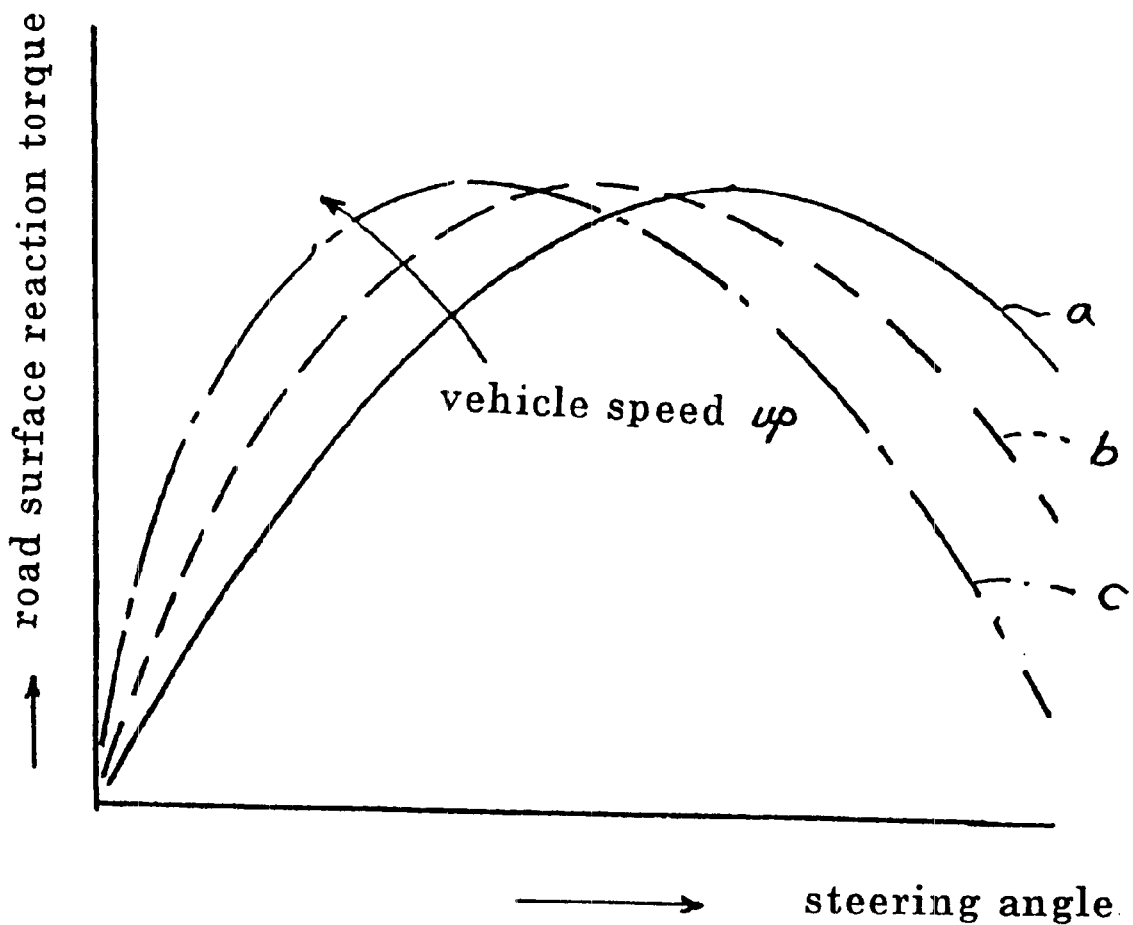
FIG. 3 is a graph of the electric power steering controller representing characteristics of a second road surface reaction torque in the embodiment 1 according to the present invention.

FIG. 3 is a graph of the electric power steering controller representing characteristics of a second road surface reaction torque in the embodiment 1 according to the present invention.

In the embodiment 1, the electric power steering controller has the first road surface reaction torque estimator 15 for estimating the first road surface reaction torque and the second road surface reaction torque estimator 16 for estimating the second road surface reaction torque, and generates the auxiliary return torque signal of the steering wheel.

Hereafter, an explanation is made of the electric power steering controller configured in the embodiment 1 as described above.

In step S101, a steering torque, Thd1, is read and stored into a memory by the steering torque detector 1, and in step S102, the auxiliary torque signal, Ibase, is computed by the steering torque controller 2. In step S103, the speed signal of the motor by the motor speed detector 3 is read, and in step S104, the motor speed signal is differentiated in the motor acceleration detector 5 for obtaining the motor acceleration signal.

In step S105, the motor current, Imtr, is read and stored into a memory by the motor current detector 11. In step S106, the first road surface reaction torque is computed in the first road surface reaction torque estimator 15. Then, in step S107, the return torque compensator 17 multiplies the first road surface reaction torque by a single or a plural stage gain constant, and then limits a maximum value of the multiplied signal for computing the first auxiliary return torque signal of the steering wheel, Itire_trq. In step S108, the steering angle θ hd1 is read and stored into a memory. In step S109, the vehicle speed is read and stored into a memory by the vehicle speed detector 4. Then, in step S110, the second road surface reaction torque is computed in the second road surface reaction torque estimator 16. In step S111, the return torque compensator17 multiplies the second road surface reaction torque by a single or a plural stage gain constant, and then limits a maximum value of the multiplied signal for computing the second auxiliary return torque signal of the steering wheel (Itire_agl.).

In step S112, the return torque compensator 17 computes a weight coefficient w by referring to a memorized look-up table holding a fixed value to the vehicle speed. And in step S113, the return torque compensator 17 computes the auxiliary return torque signal of the steering wheel based on a equation (1).

$$I\text{tire} = w \cdot I\text{tire\_trq} + (1-w) I\text{tire\_agl} \tag{1}$$

In the equation (1), the weight coefficient depends on the vehicle speed, and its possible range is expressed as $0 \leq w \leq 1$.

In step S114, the motor current determiner 9 computes the aimed torque based on a equation (2), $$I\text{ref} = I\text{base} + I\text{tire} \tag{2}$$

and then multiplies the aimed torque by a gain constant for computing the aimed current signal, wherein the gain constant is set to be a reciprocal of a torque constant of the motor 10 in steering conversion.

Hereafter, a function of step S106, wherein the first road surface reaction torque is estimated by the first road surface reaction torque estimator 15., is to be explained in detail.

First of all, a stationary reaction signal, T'rea_est, is obtained by an equation (3) as below using the steering torque signal, Tsens, the motor acceleration signal, dω, equivalent to a rotating acceleration of a steering axis, and the motor current signal, Imtr.

$$T\text{rea\_est} = T\text{sens} + Kt \cdot I\text{mtr} - J \cdot d\omega \tag{3}$$

where

Kt: a torque constant of a motor in steering axis conversion

J: a moment of inertia of a steering mechanism

Then, a primary filtering computation is carried out based on an equation (4) as shown below using a stationary reaction signal by a low pass filter installed in the first road surface reaction torque estimator 15, and resultantly the first road surface reaction torque signal, T'rea_est, is obtained.

$$d\,T\text{rea\_est}/dt = -T\text{rea\_est}/T1 + T\text{rea\_est}/T1 \tag{4}$$

where T1 denotes a time constant of the primary filtering, and a cut-off frequency fc=1/(2π·T1) is determined to be in a range from 0.5 to 1.0 Hz.

A reason why the first road surface reaction torque can be detected from the equation (3) and (4) is explained in the following.

A motion equation of the steering mechanism is expressed by an equation (5) as shown below.

$$J \cdot d\omega s/dt = T\text{hdl} + T\text{mtr} - T\text{fric} - T\text{react} \tag{5}$$

where dωs/dt: an axial rotation acceleration

Tdhl: a steering torque

Tmtr: a motor output torque converted in steering axis conversion

Tfric: a friction torque in a steering mechanism

Treact: a road surface reaction torque in steering axis conversion

The equation (5) becomes an equation (6) as shown below if it is solved for the road surface reaction torque, Treact.

$$T\text{react} = T\text{dhl} + T\text{mtr} - J \cdot d\omega s/dt - T\text{fric} \tag{6}$$

Therefore, the first road surface reaction torque, Treact, is capable of being obtained using the steering torque, the motor output torque, the steering axis rotation acceleration and a friction torque in the steering mechanism. The steering torque signal, Tsens, is capable of being used as the steering torque, Thdl, and a value of the motor current, Imtr, multiplied by the torque constant, Kt, can be used as the motor output torque, Tmtr. Moreover, the motor acceleration signal, dω, is possible to be used as the steering axis rotation acceleration, dωs/dt. In this way, the road surface reaction torque excluding a effect of the friction torque in the steering mechanism, Tfric, can be detected by the equation (3).

Whereas, the friction torque, Tfric, works as a relay for a rotating speed of the steering mechanism. Moreover, it is widely known in a control engineering field that a function of the relay can be represented equivalently with a gain and a phase using an equivalent linearisation method. Therefore, by adjusting the gain and the phase of the stationary reaction signal, T'rea_est, detected by the equation (3) based on the primary filtering of the equation (4), the first road surface reaction torque signal, Trea_est, is obtained More in detail, a filtering is a most frequently used method in adjusting the gain and the phase. In filtering, the gain and the phase are adjustable only above the cut-off frequency range. Namely, if the cut-off frequency is set in a range of the frequency desired to be adjusted multiplied by a factor of 0.5 to 1.0, the gain is approximately adjustable in a range of 1.0 to 0.5, and similarly, the phase in a range of 0.1 to −20 deg. Here, an effect of the friction torque can be cancelled in most cases. In an automotive vehicle, a steering frequency, in general, is in a range of 0.1 to 1.0 Hz. Namely, if the cut-off frequency is set to be a steering frequency multiplied by a factor of 0.5 to 1.0 which is equal to 0.05 to 1.0 Hz, the effect of the friction torque can be cancelled. Actually, the cut-off frequency is set aiming at most effectively controllable steering frequency based on the detected road surface reaction torque signal.

Based on a relationship of characteristics as shown in FIG. 3 between the steering angle and the road surface reaction, step S110 is explained in detail, wherein the second road surface reaction torque estimator 16 estimates the second road surface reaction torque from the steering angle, θ hdl, and the vehicle speed, Vx. In FIG. 3 there is a relation of curve a<curve b<curve c for the vehicle speed.

It is due to the relationship as shown below that the road surface reaction torque, that is, a self-aligning torque is calculable from the steering angle.

As a cornering force works at a backward position of a tier on a grounding surface contacting a road, the tier is always receiving a self-aligning torque during running which lets the vehicle steer into the running direction. In a region of a small skid angle, for example, such as up to 4 to 6 deg., the skid angle and the cornering force are in proportional relationship with each other, and the self-aligning torque is also approximately proportional to the skid angle. Moreover, the skid angle in its small region of the same tier corresponds to the steering angle by one to one relationship when the vehicle speed is fixed. In this manner, the self-aligning torque is obtained from the steering angle.

The relationship between the skid angle and the steering angle is determined for each vehicle speed, and both the cornering force and the self-aligning torque correspond to the skid angle, therefore, to the steering angle for each vehicle speed by one to one relationship once the road surface condition is determined. Then, the self-aligning torque, that is, the road surface reaction torque, for the steering angle is determined beforehand in terms of each vehicle speed based on the experiment data on the high friction road with a specific vehicle height. Accordingly, the road surface reaction torque is able to be estimated by the second road surface reaction torque estimator 16 which is installed in the electric power steering controller based on the above mentioned relationship.

Moreover, although the relationship in characteristics in FIG. 3 is predetermined for the high friction road, wherein $\mu$ represents a friction coefficient, a cornering power becomes smaller as $\mu$ becomes lower for the road surface condition, and so the self-aligning torque, Trea, given by an equation (7) becomes smaller as $\mu$ becomes lower $$T\text{rea} = \xi \cdot Kf \cdot \beta f \tag{7}$$

where $\xi$: a sum of a caster trail and a pneumatic trail

Kf: a cornering power of a front wheel $\beta f$: a skid angle of a front tier

Therefore, from the relationship (7), the estimated value of the second road surface reaction torque predetermined for the high $\mu$ road differs fundamentally from the estimated value of the first road surface reaction torque.

According to the embodiment 1, by estimating the road surface reaction torque using the first and the second reaction torque estimators, the suitable auxiliary torque of the motor can be generated. And the returnable ability of the steering wheel can be promoted under various driving conditions including a high speed running, wherein a resolution of a steering angle sensor becomes insufficient due to a small width of change in the steering angle.

Hereafter, a detailed explanation concerning an embodiment 2 is made making use of FIG. 4 to FIG. 7.

Figure 4:
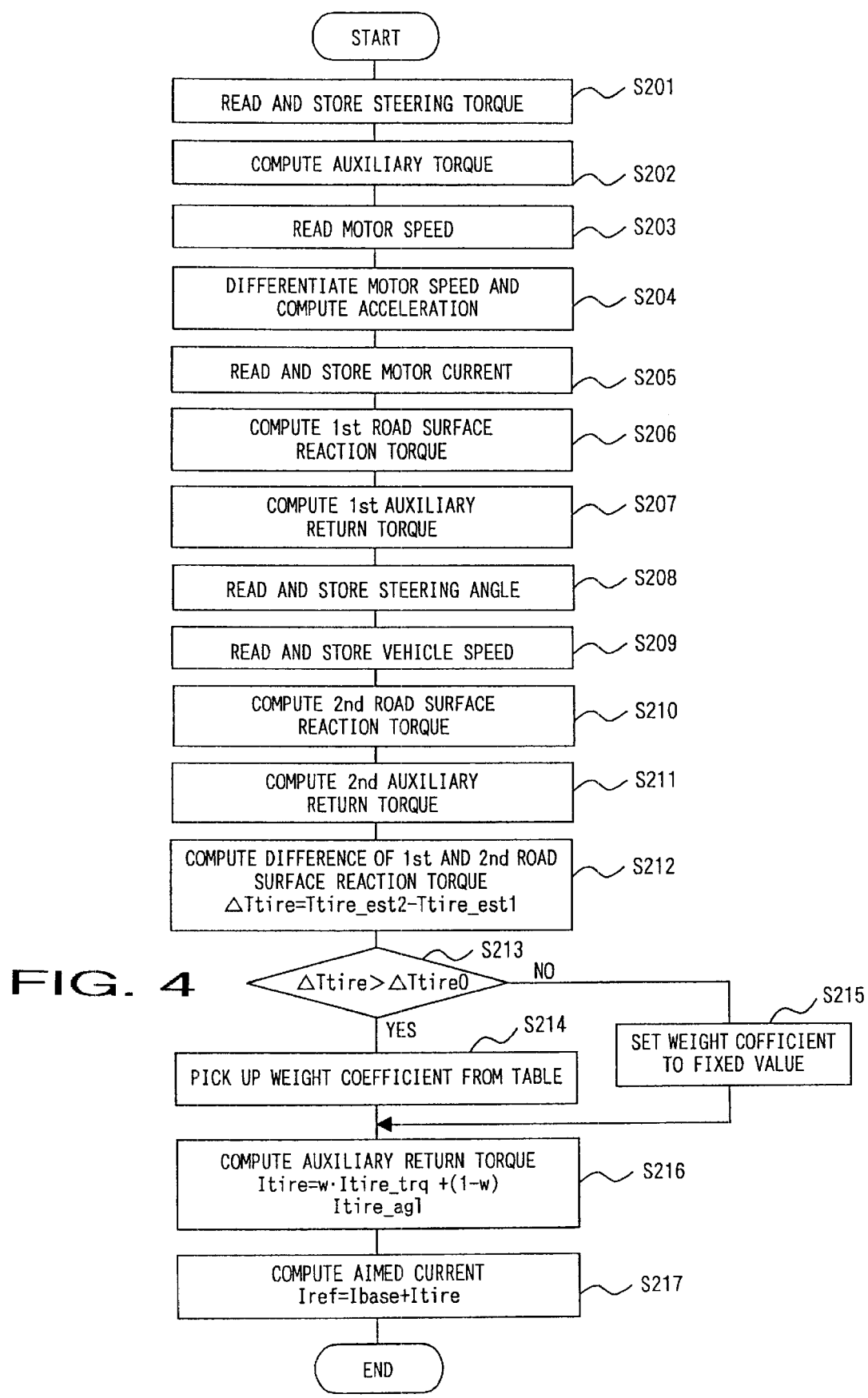
FIG. 4 is a flow chart of the electric power steering controller explaining an operation in an embodiment 2 according to the present invention.

FIG. 4 is a flow chart of the electric power steering controller explaining an operation in the embodiment 2 according to the present invention.

Figure 5:
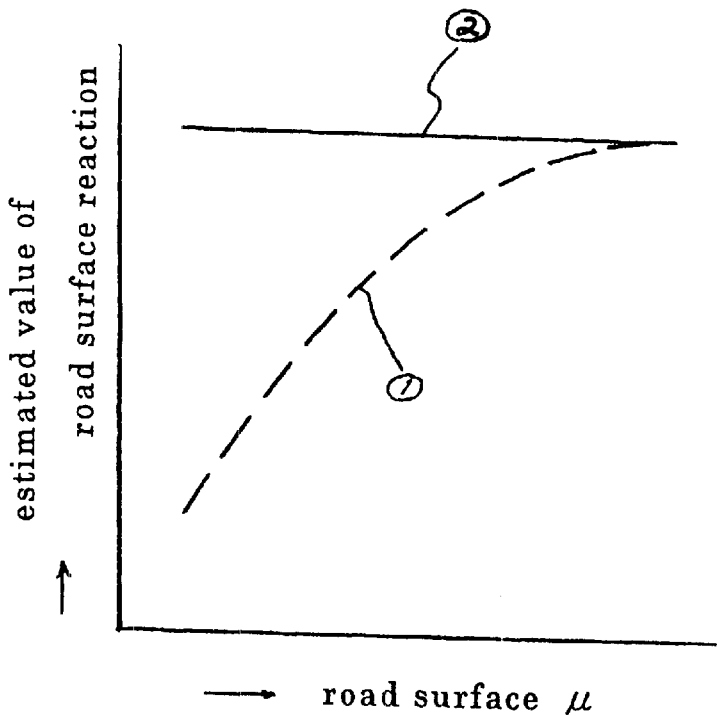
FIG. 5 is a graph of the electric power steering controller representing a relationship of the estimated values between a first and the second road surface reaction torques in the embodiment 2 according to the present invention.

FIG. 5 is a graph of the electric power steering controller representing a relationship of the estimated values between a first and the second road surface reaction torques in the embodiment 2 according to the present invention.

Figure 6:
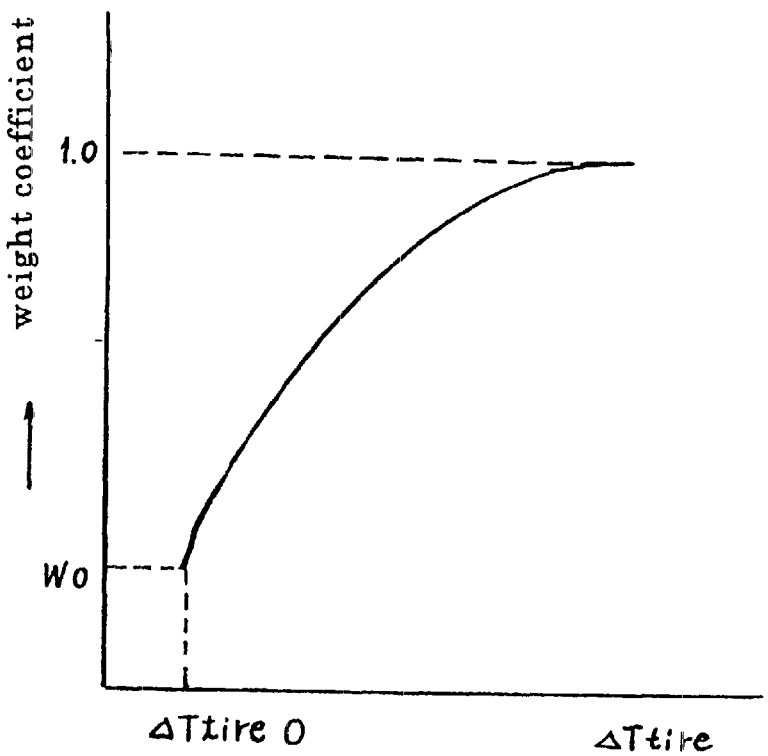
FIG. 6 is a graph of the electric power steering controller explaining a relationship between a difference of the estimated values of the first and the second road surface reaction torques, and a weight coefficient in the embodiment 2 according to the present invention.

FIG. 6 is a graph of the electric power steering controller according to the present invention explaining a relationship between a difference of the estimated values of the first and the second road surface reaction torques and a weight coefficient in the embodiment 2. In this FIG. 6 $\Delta$ Ttire is a difference of the estimated values between the first and the second road surface reaction torques, and $\Delta$ Ttire0 is a threshold value of an allowable error for the first and the second reaction torques mentioned above. w0 is the weight coefficient corresponding to $\Delta$ Ttire0.

Figure 7:
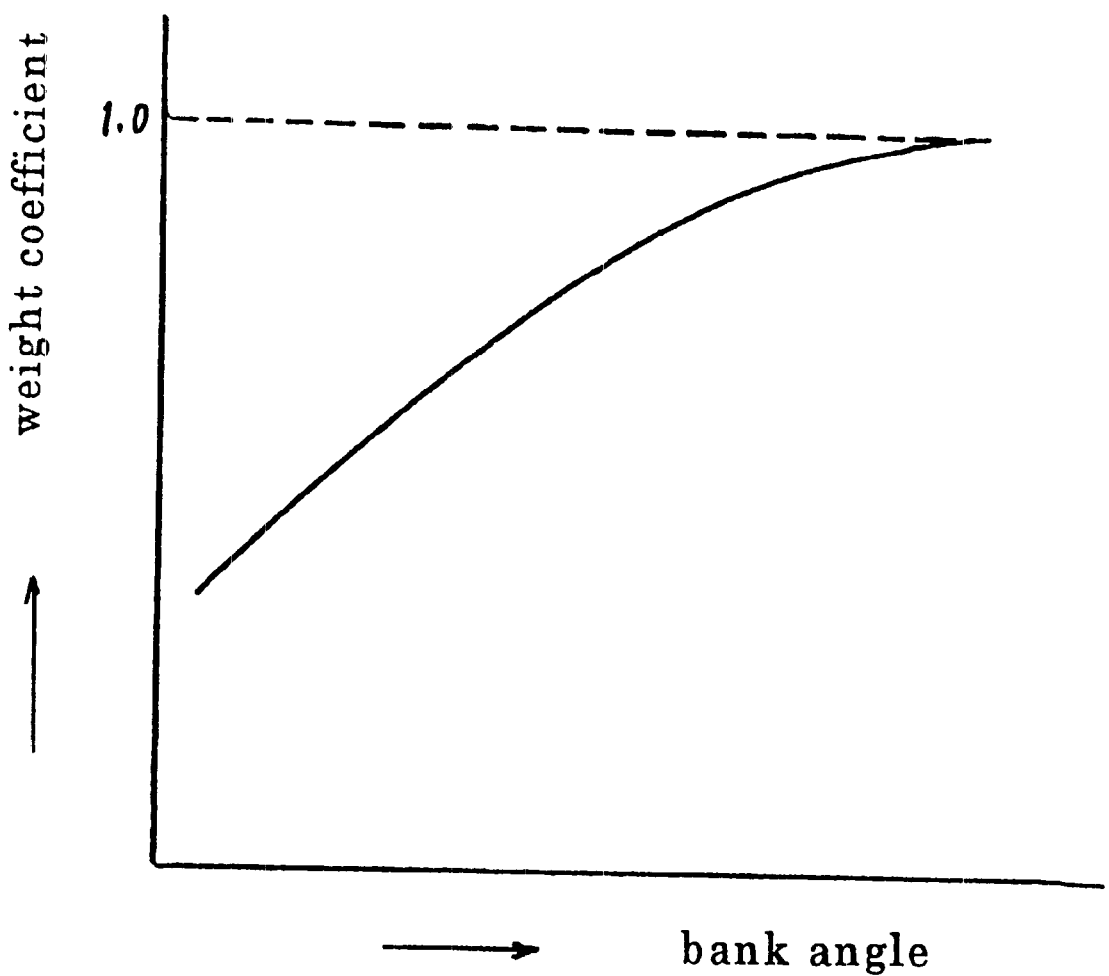
FIG. 7 is a graph of the electric power steering controller explaining a relationship between a bank angle and the weight coefficient in the embodiment 2 according to the present invention.

FIG. 7 is a graph of the electric power steering controller explaining a relationship between a bank angle and a weight coefficient in the embodiment 2 according to the present invention.

In the embodiment 2, the weight coefficient w is determined from a characteristic curve in FIG. 6 based on the difference of the estimated values between the first and the second road surface reaction torques denoted respectively by curve ① and curve ② in FIG. 5.

Furthermore, as shown in FIG. 7, the bank angle used for obtaining the weight coefficient is an estimated value of the bank angle computed in a brake control unit (abbreviated for explanation) in case there exists the bank angle which is a leaning angle for the running direction. In FIG. 3, the characteristic relationship is based on a zero bank angle, and an error of the estimated value of the second road surface reaction torque is produced as the bank angle becomes large.

Therefore, in this case the weight coefficient is made to be larger for reflecting an error effect in the estimated value of the above reaction torque.

An operation of the electrical power steering controller in the embodiment 2 is executed in the following based on FIG. 2.

A processing function of step S201 to S211 is same with step S101 to S111. In steps following step S211, steps are carried out by the return torque compensator 17 as explained hereafter. Firstly, in step S212 a difference of the estimated values between the first and the second road surface reaction torques is computed by an equation (8).

$$\Delta T\text{tire} = T\text{tire\_est2} - T\text{tire\_est1} \tag{8}$$

where

Ttire_est1: an estimated value of the first road surface reaction torque

Ttire_est2: an estimated value of the second road surface reaction torque

Secondly, in step S213 the difference from step S212 is compared with a threshold value, $\Delta$ Ttire0. A process advances to step 214 if $\Delta$ Ttire is larger than $\Delta$ Ttire0, and the weight coefficient w is determined from $\Delta$ Ttire by referring to a memorized look-up table, wherein a fixed value is stored beforehand. If $\Delta$ Ttire is smaller than or equal to $\Delta$ Ttire0, a processing proceeds to step S215, and the weight coefficient w is set to be w0. In step S216 following step 214 or step 215, the auxiliary return torque signal of the steering wheel is computed by the equation (1).

Then, in step S217 an aimed torque signal is obtained by the motor current determiner 9 using the equation (2), and an aimed current is obtained from multiplying the aimed torque by a gain constant. In this case, the gain constant is set equal to be a reciprocal of a torque constant of the motor 10 in steering conversion In the embodiment 2, as a weighting is done for the estimated values of both the first and the second road surface reaction torques, a suitable auxiliary return torque signal of the steering wheel is given even when the bank angle is existing.

Figure 8:
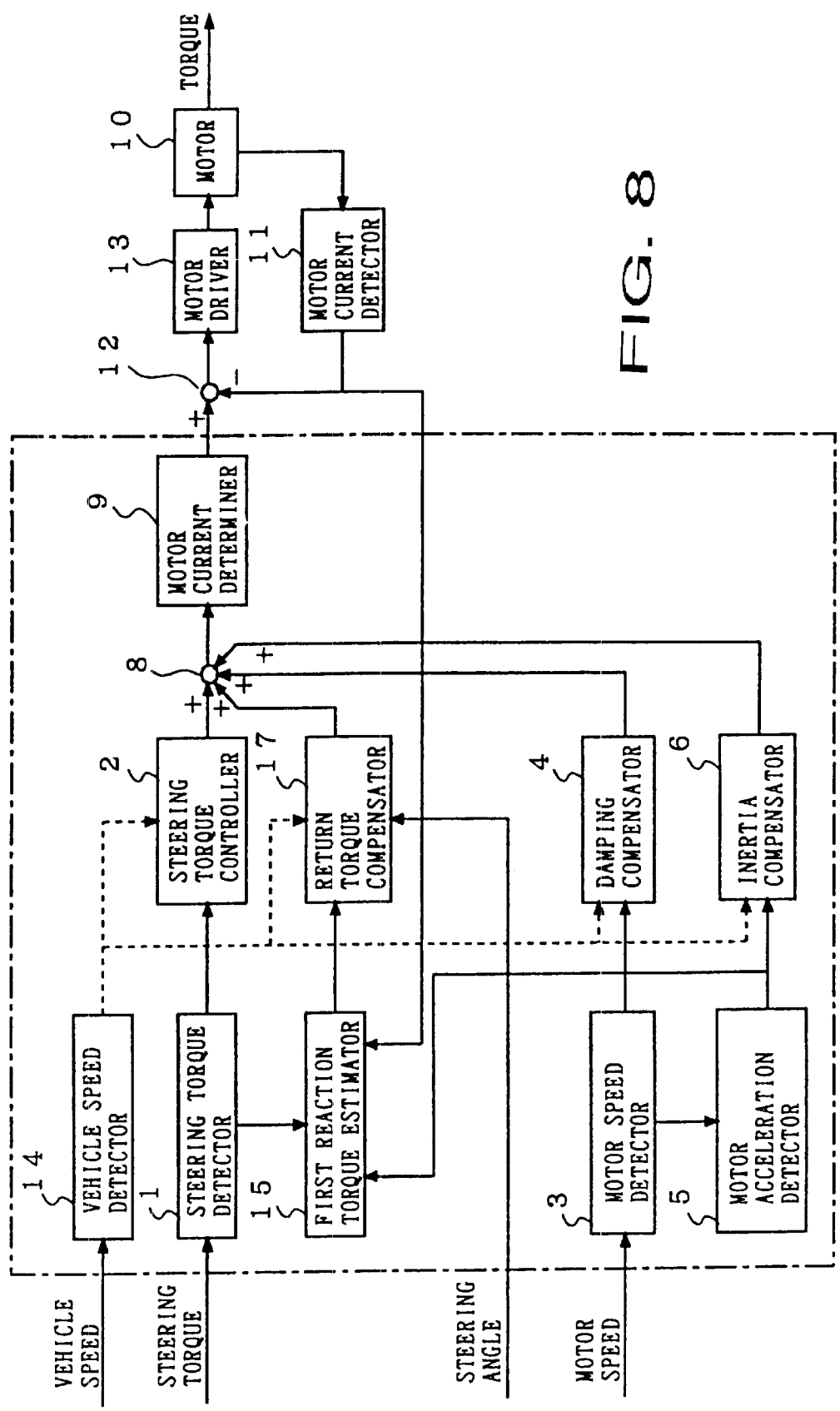
FIG. 8 is a block diagram showing a configuration of the electric power steering controller in an embodiment 3 according to the present invention.
Figure 9:
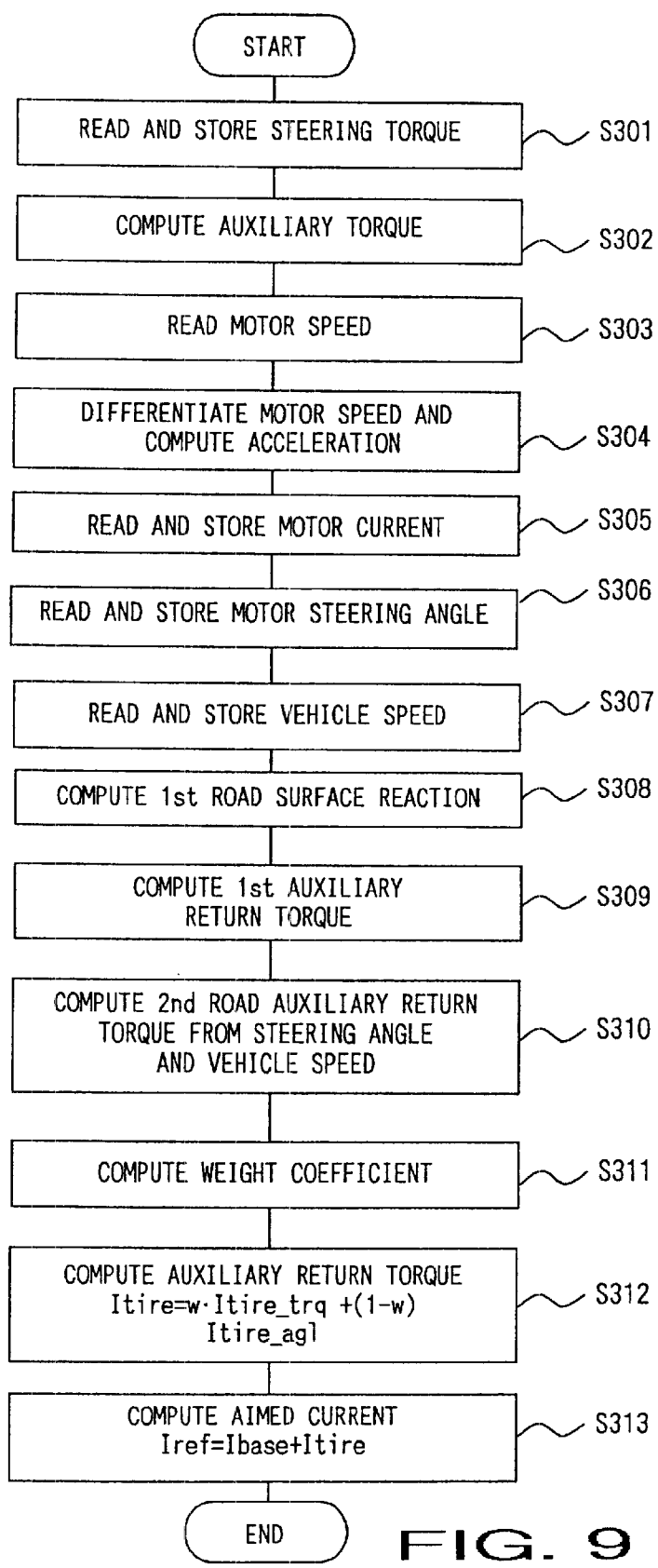
FIG. 9 is a flow chart of the electric power steering controller in the embodiment 3 according to the present invention.

From here, an explanation of an embodiment 3 according to the present invention is made using FIG. 8 and FIG. 9.

FIG. 8 is a block diagram showing a configuration of the electric power steering controller in the embodiment 3 according to the present invention. In this FIG. 8, a denotation of 1 to 6, 8 to 15 and 17 is same with that of FIG. 1.

In the embodiment 3, a second auxiliary return torque signal of the steering wheel is directly derived from the steering angle and the vehicle speed. Namely, an auxiliary return torque signal of the steering wheel is computed from the estimated values of both the first and the second auxiliary return torque signals derived from the estimated value of the first road surface reaction torque.

FIG. 9 is a flow chart of the electric power steering controller in the embodiment 3 according to the present invention.

Hereafter, an operation of the electric power steering controller in the embodiment 3 is explained based on FIG. 9.

A processing of step S301 to S305 is same with that of step S101 to S105. In step S306, the steering angle θ dh1 is read and stored into a memory. In step S307, the vehicle speed, Vx, is read by the vehicle speed detector 14 and stored into a memory. In step S308, the first road surface reaction torque is estimated in the first road surface reaction torque estimator 15. Then in step S309, the first auxiliary return torque signal of the steering wheel, Itire_trq, is computed ,and in step S310, the second auxiliary return torque signal of the steering wheel is computed from the steering angle, θ dh1, and the vehicle speed, Vx. In step S311, the weight coefficient is computed, and in step S312, the auxiliary return torque signal of the steering wheel is derived by the equation (1). And finally in step S313, an aimed torque is derived by the motor current determiner 9 using the equation (2), and the aimed torque is multiplied by a gain constant for obtaining an aimed current. In this case, the gain constant is set equal to be a reciprocal of the torque constant of the motor in steering conversion.

According to the embodiment 3, the second auxiliary return torque signal of the steering wheel is directly derived from the steering angle and the vehicle speed, and hence, the second road surface reaction torque estimator can be abbreviated.

Figure 10:
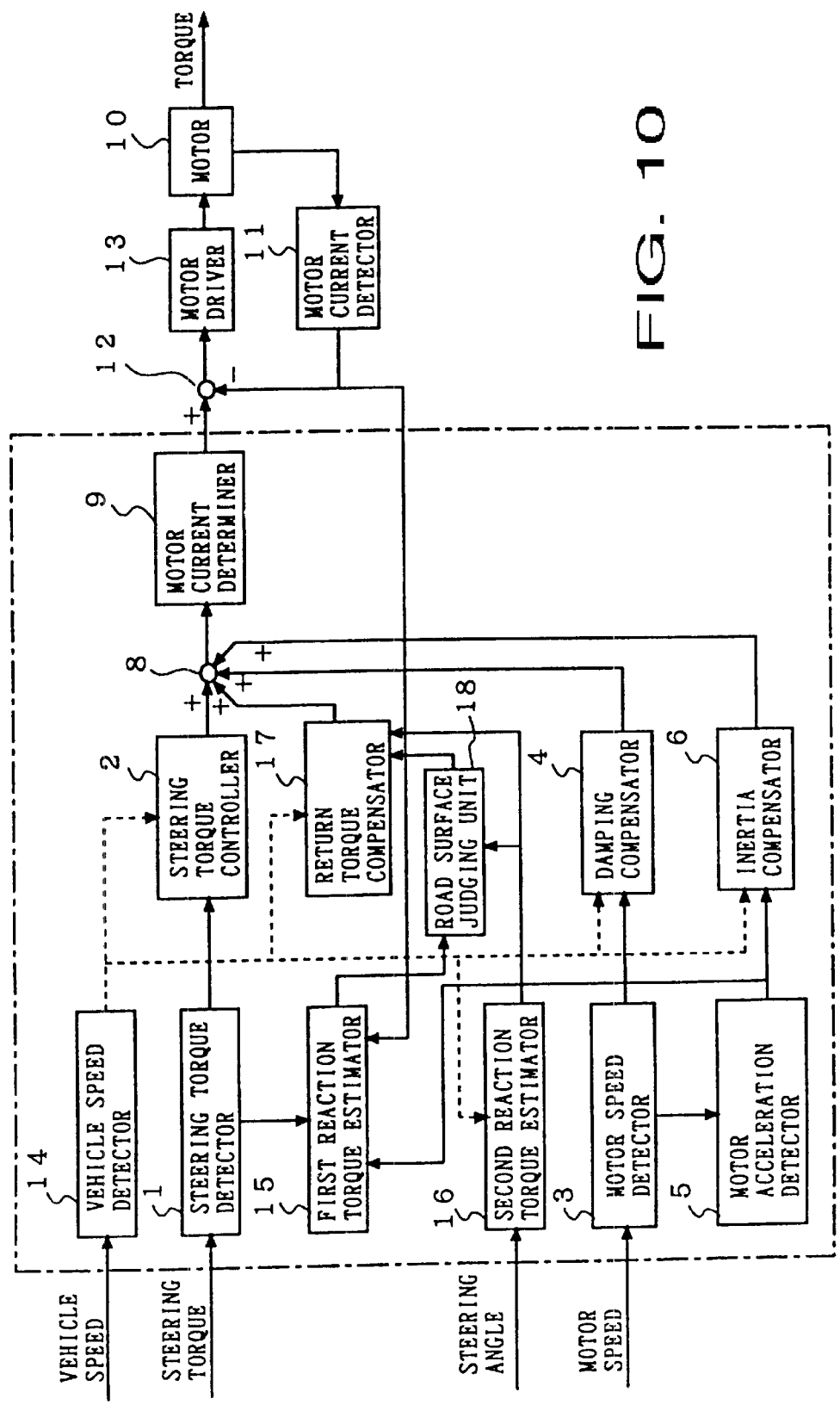
FIG. 10 is a block diagram of the electric power steering controller in an embodiment 4 and 5 according to the present invention.
Figure 11:
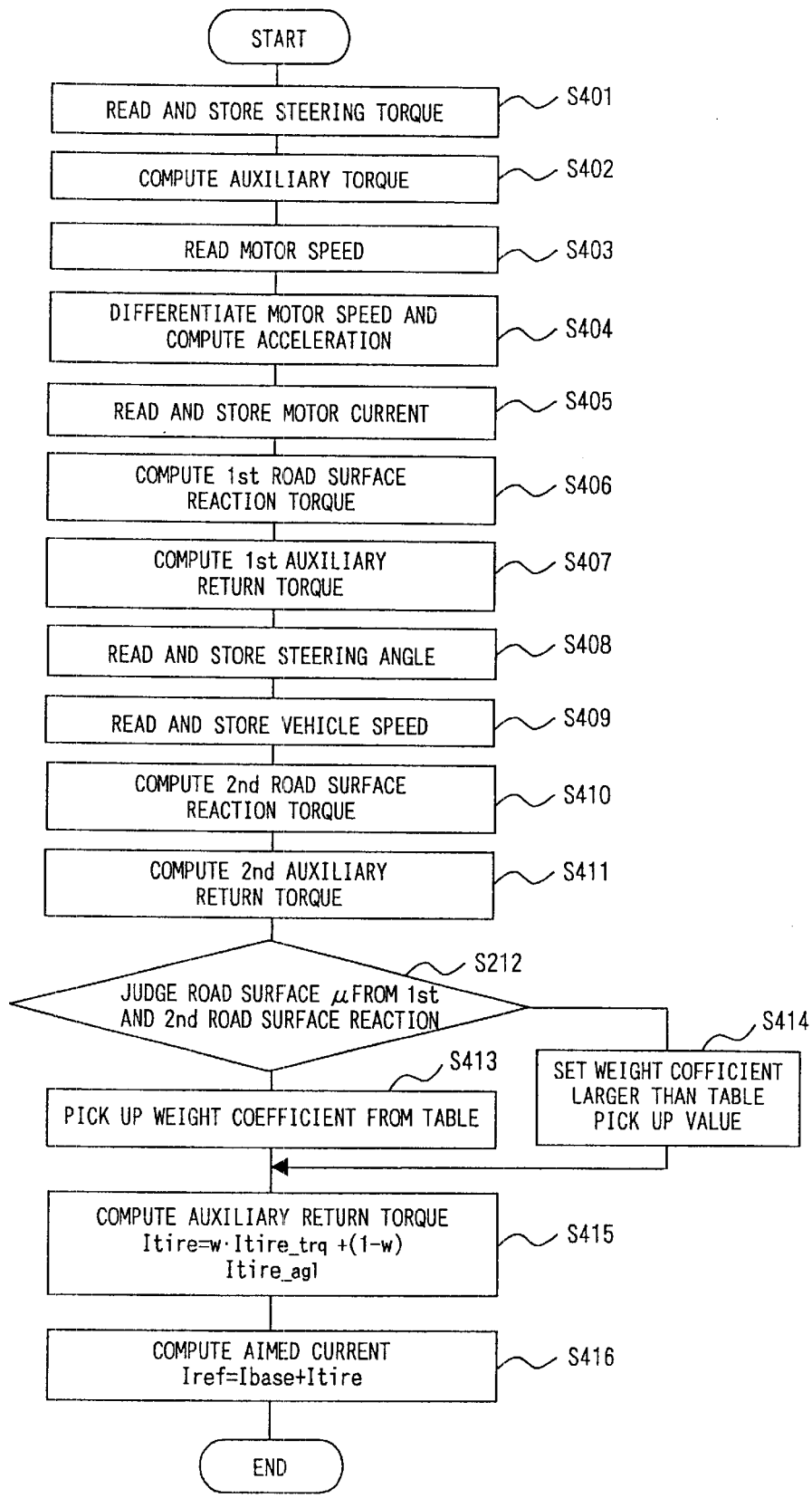
FIG. 11 is a flow chart explaining an operation of the electric power steering controller in the embodiment 4 according to the present invention.

Hereafter, an operation of the electric power steering controller in an embodiment 4 according to the present invention is explained based on FIG. 10 and FIG. 11.

FIG. 10 is a block diagram of the electric power steering controller according to the present invention.

In FIG. 10, a denotation of 1 to 6 and 8 to 17 is same with that of FIG. 1. In this FIG. 10, a road surface judging unit 18 is for judging a road surface condition from the estimated values of both the first and the second road surface reaction torques.

FIG. 11 is a flow chart explaining an operation of the electric power steering controller in the embodiment 4 according to the present invention.

A feature of the embodiment 4 lies in an installment of the road surface judging unit 18.

An estimated value of the first road surface reaction torque becomes small when a road surface μ, a friction coefficient, is small as the above estimation value is derived from an actual road surface reaction. Contrary to this, as an absolute value of an estimated value of the second road surface reaction torque is based on a model with a high μ road, the absolute value never becomes small when a road μ is small.

Therefore, when the estimated value of the second road surface reaction torque is larger than that of the first road surface reaction torque by a predetermined value in terms of a difference or a ratio, a road surface can be judged to be a low μ road.

In case a road surface condition is judged to be the low μ road in the embodiment 4, the weight coefficient is made to be larger in computing the first auxiliary return torque signal of the steering wheel.

From here, the electric power steering controller in the embodiment 4 is explained using FIG. 11.

Step S401 to S411 is similarly processed as in step S101 to step S111. In step S412, the road surface judging unit 18 judges a road μ from the estimated values of the first and the second road surface reaction torques. In step S413, if the road surface condition is judged to be a high μ road by the road surface judging unit 18, the return torque compensator 17 determines a weight coefficient, w, by referring to a look-up table for the vehicle speed. Whereas, if the result is judged to be a non-high μ road in step S412, the weight coefficient is set to be larger than that of high μ road by referring to the look-up table for the vehicle speed in step S414. And in step S415 after step S413 or S414 is executed, the return torque compensator 17 computes the auxiliary return torque signal of the steering wheel by the equation (1).

Then, in step S416, an aimed torque is computed by the equation (2), and an aimed current is derived from the aimed torque multiplied by a gain constant by the motor current determiner 9. In this case, the gain constant is set equal to a reciprocal of the torque constant of the motor in steering conversion.

In the embodiment 4, as the weight coefficient is changed according to the road surface condition in computing the auxiliary return torque signal of the steering wheel, a suitable auxiliary return torque signal of the steering wheel can be given regardless of the road surface condition. From here, the electric power steering controller in an embodiment 5 is explained using FIG. 12.

In the embodiment 5, a second auxiliary return torque signal is made to be small when a road surface is judged to be a non-high μ road.

Figure 12:
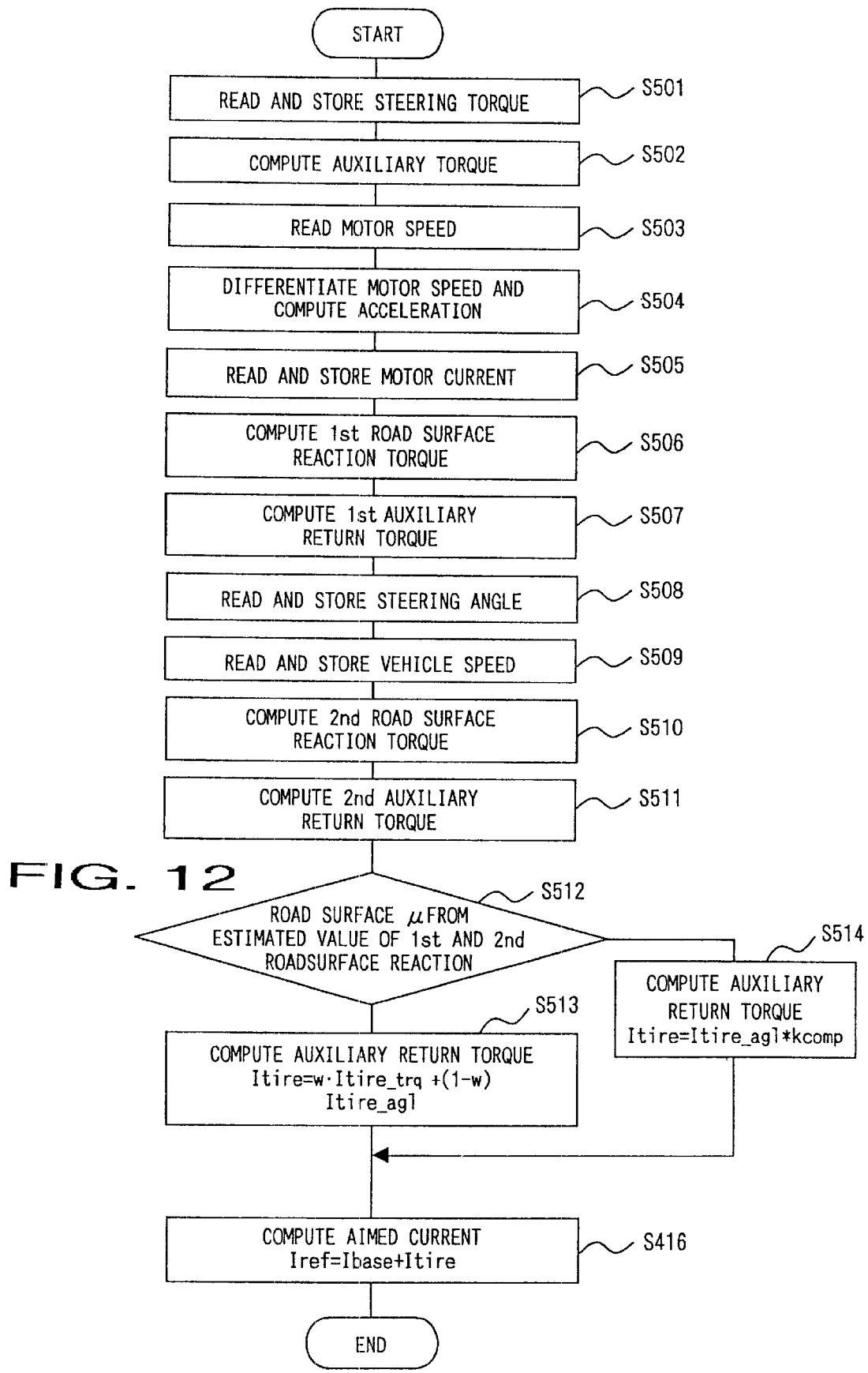
FIG. 12 is a flow chart explaining an operation of the electric power steering controller in the embodiment 5 according to the present invention.
Figure 13:
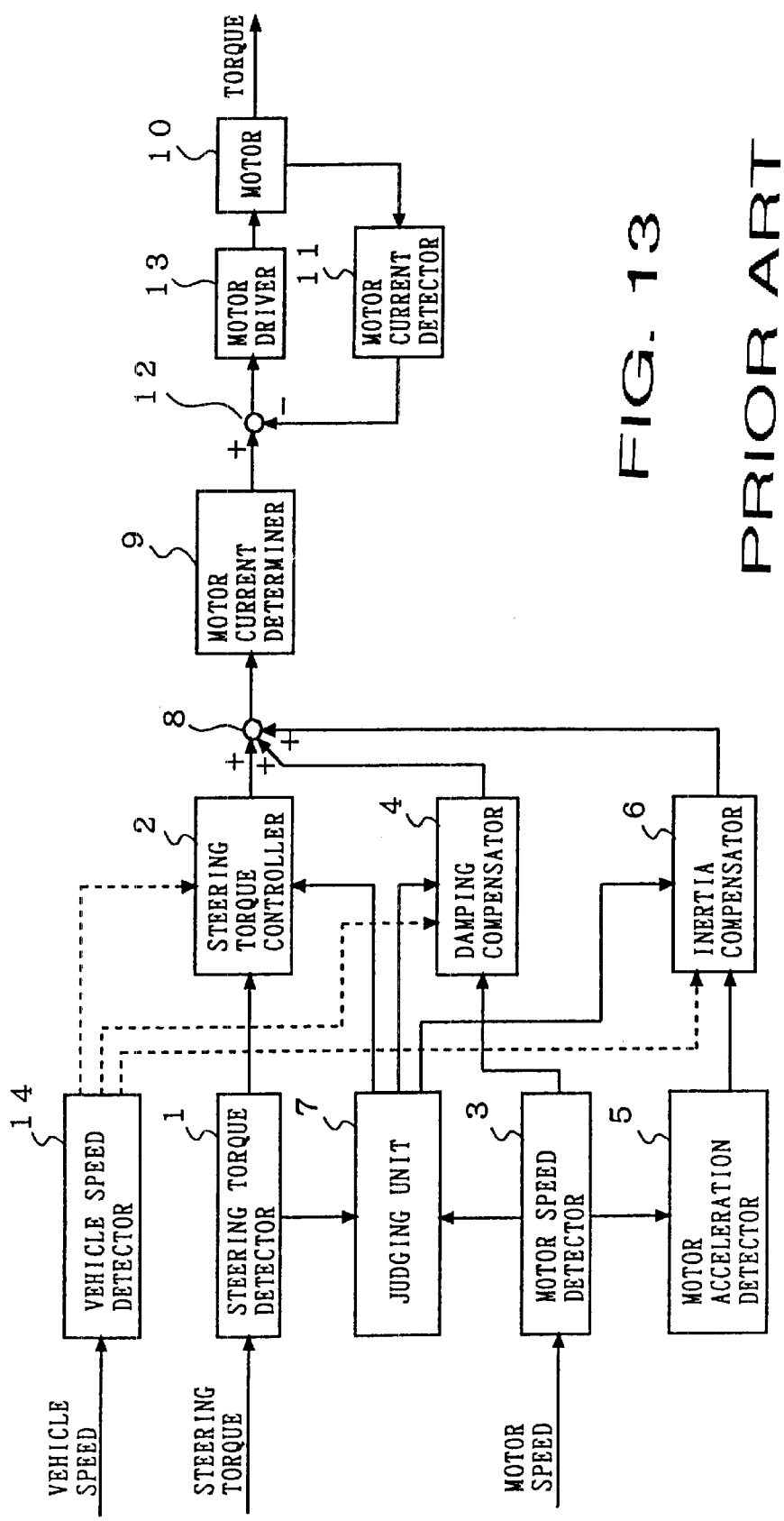
FIG. 13 is a block diagram showing a configuration of an electric power steering controller in the prior art.

FIG. 12 is a flow chart explaining an operation of the electric power steering controller in the embodiment 5 according to the present invention. In this FIG. 12, a processing of step S501 to S511 is same with step S401 to S411 in FIG. 11. In step S512 following step S511, a road surface μ is judged from the estimated values of the first and the second road surface reactions by the road surface judging unit 18.

If the judged result from the road surface condition judging unit 18 is a high μ road, an auxiliary return torque signal of the steering wheel is computed by an equation, $$I\text{tire} = I\text{tire\_agl}$$

and is made equal to the second auxiliary return torque signal in step S513. If the above result is a non-high μ road, the auxiliary return torque signal of the steering wheel is computed by an equation, $$I\text{tire} = I\text{tire\_agl} * k\text{comp}$$

where kcomp: a coefficient ($0 \leq k\text{comp} < 1$) and the second auxiliary return torque signal is made to be small including 0.

Then, in step S515, an aimed torque is computed by the equation (2), and an aimed current is derived from the aimed torque multiplied by a gain constant by the motor current determiner 9. In this case, the gain constant is set equal to a reciprocal of the torque constant of the motor in steering conversion.

According to the embodiment 5, when the road surface is a non-high μ road, the auxiliary return torque signal of the steering wheel is made small, and hence, a suitable auxiliary return torque signal of the steering wheel can be given regardless of a road surface condition.

What is claimed is:

1. An electric power steering controller for a vehicle to assist steering torque of a driver applied to a steering wheel, comprising:

a motor for generating an assistant torque to assist steering torque of a driver steering torque detecting means for detecting the steering torque of a driver, steering angle detecting means for detecting a steering angle of the steering wheel, first reaction torque estimating means for estimating a first road surface reaction torque using the steering torque detected by said steering torque detecting means, second reaction torque estimating means for estimating a second road surface reaction torque using the steering angle detected by said steering angle detecting means, and return torque compensating means for computing a first auxiliary return torque signal to control the assistant torque of said motor, depending on the first road surface reaction torque estimated by said first reaction torque estimating means, and for computing a second auxiliary return torque signal to control the assistant torque of said motor, depending on the second road surface reaction torque estimated by said second reaction torque estimating means, wherein said return torque compensating means controls the assistant torque of said motor in direction to return the steering wheel to an original position by using both of the first and said second auxiliary return torque signals.

2. The electric power steering controller of claim 1, wherein said return torque compensating means multiplies the second road surface reaction torque estimated by said second reaction torque estimating means by a gain constant to produce a product, and limits the product to a maximum value for computing the second auxiliary torque signal.

3. The electric power steering controller of claim 1, wherein said return torque compensating means multiplies the road surface reaction torque detected by said reaction torque estimating means by a gain constant to produce a product, and computes the first auxiliary return torque signal by limiting the product to a maximum value with a limiter.

4. The electric power steering controller in claim 1, wherein said return torque compensating means controls the assistant torque of said motor by multiplying the first and second auxiliary return torque signals by weight coefficients.

5. The electric power steering controller of claim 4, wherein the weight coefficients are based on at least one signal of a vehicle speed signal and a bank angle signal on a road surface.

6. The electric power steering controller of claim 5, wherein the weight coefficients are based on a comparison between the first and second road surface reaction torques.

7. The electric power steering controller of claim 6, wherein the weight coefficients are based on a difference between first and second road surface reaction torques.

8. The electric power steering controller of claim 6, wherein the weight coefficients are based on a ratio of the first and second road surface reaction torques.

9. The electric power steering controller of claim 4, further comprising road surface condition judging means for judging a road surface condition using the first and second road surface reaction torques.

10. The electric power steering controller of claim 9, wherein said road surface condition judging means compares an absolute value of the first road surface reaction torque with an absolute value of the second road surface reaction torque, and judges a road surface condition to be a low friction road if the absolute value of the second road surface reaction torque is larger than the absolute value of the first road surface reaction torque, and, simultaneously if a difference between the absolute values of the first and second road surface reaction torques exceeds a predetermined value.

11. The electric power steering controller in claim 9, wherein said road surface condition judging means compares an absolute value of the first road surface reaction torque with an absolute value of the second road surface reaction torque, and judges a road surface condition to be a low friction road if the absolute value of said second road surface reaction torque is larger than the absolute value of the first road surface reaction torque, and, simultaneously, if a ratio of the absolute values of the first and second road surface reaction torques exceeds a predetermined value.

12. The electric power steering controller of claim 9, wherein a result from said road surface condition judging means is used to compensate for the weight coefficients.

13. The electric power steering controller in claim 12, wherein said return torque compensating means makes the weight coefficient to be multiplied by said first auxiliary return torque signal larger if a road surface condition is judged to be a low friction road by said road surface condition judging means.

14. The electric power steering controller of claim 12, wherein said return torque compensating means controls the assistant torque of said motor based on the second auxiliary return torque signal if the road surface condition is judged to be a high friction road by said road surface condition judging means, and also controls the assistant torque of said motor by making the weight coefficient to be multiplied by the second auxiliary return torque signal smaller if the road condition is judged to be friction road by said road surface condition judging means.

15. An electric power steering controller for a vehicle for assisting steering torque of a driver applied to a steering wheel, comprising:

a motor for generating an assistant torque to assist steering torque of a driver, speed detecting means for detecting a speed of the vehicle, steering torque detecting means for detecting the steering torque of a driver, steering angle detecting means for detecting a steering angle of the steering wheel, acceleration detecting means for detecting acceleration of said motor, current detecting means for detecting current of said motor, first reaction torque estimating means for estimating a first road surface reaction torque obtained by passing a signal through a low pass filter, wherein the signal is computed from the steering torque detected by the steering torque detecting means, the acceleration of said motor detected by said acceleration detecting means, and the current of said motor detected by said current detecting means, second reaction torque estimating means for estimating a second road surface reaction torque using the speed of the vehicle detected by said speed detecting means, and the steering angle detected by said steering angle detecting means, and return torque compensating means for computing a first auxiliary return torque signal to control the assistant torque of said motor depending on the first road surface reaction torque estimated by said first reaction torque estimating means, and for computing a second auxiliary return torque signal to control the assistant torque of said motor depending on the second road surface reaction torque estimated by said second reaction torque estimating means, wherein said return torque compensating means controls the assistant torque of said motor in a direction for the steering wheel to return to an original position using both of the first and second auxiliary return torque signals.

16. An electric power steering controller for assisting a steering torque of a driver applied to a steering wheel, comprising:

a motor for generating an assistant torque to assist steering torque of a driver, steering torque detecting means for detecting the steering torque of a driver, steering angle detecting means for detecting a steering angle of the steering wheel, reaction torque estimating means for estimating a road surface reaction torque using the steering torque detected by said steering torque detecting means, and return torque compensating means for computing a first auxiliary return torque signal to control the assistant torque of said motor depending on the road surface reaction torque estimated by said reaction torque estimating means, and for computing a second auxiliary return torque signal to control the assistant torque of said motor depending on the steering angle detected by said steering angle detecting means, wherein said return torque compensating means controls an auxiliary torque of said motor in a direction for the steering wheel to return to an original position, using both of the first and second auxiliary return torque signals.

17. An electric power steering controller for a vehicle to assist a steering torque applied by a driver to a steering wheel, comprising:

a motor for generating an assistant torque to assist steering torque of a driver, speed detecting means for detecting speed of the vehicle, steering torque detecting means for detecting the steering torque of a driver, steering angle detecting means for detecting a steering angle of the steering wheel, acceleration detecting means for detecting acceleration of said motor, current detecting means for detecting a current of said motor, reaction torque estimating means for estimating a road surface reaction torque obtained by passing a signal through a low pass filter, wherein the signal is computed from the steering torque detected by said steering torque detecting means, the acceleration of said motor detected by said acceleration detecting means, and the current of said motor detected by said current detecting means, and return torque compensating means for computing a first auxiliary return torque signal to control the assistant torque of said motor depending on the road surface reaction torque estimated by said reaction torque estimating means, and for computing a second auxiliary return torque signal to control the assistant torque of said motor depending on the speed of the vehicle detected by said speed detecting means, and the steering angle detected by said steering angle detecting means, wherein said return torque compensating means controls the assistant torque of said motor in the direction for the steering wheel to return to an original position, using both the first and second auxiliary return torque signals.

18. An electric power steering control method for vehicle to assist a steering torque applied by a driver to a steering wheel by using a motor generated torque, comprising:

estimating a first road surface reaction torque from a steering torque, estimating a second road surface reaction torque from a steering angle, computing a first auxiliary return torque signal from the first road surface reaction torque, computing a second auxiliary return torque signal from the second road surface reaction torque, and controlling the assistant torque of the motor depending on the first and second auxiliary return torque signals so the steering wheel returns to an original position.

19. The electric power steering control method of claim 18 further comprising weighting the first and second auxiliary return torque signals for use in controlling the assistant torque of the motor.

20. The electric power steering control method of claim 19 comprising determining a road surface condition from the first and second road surface reaction torques, and compensating a weight coefficient for weighting according to the determining.

* * * * *